(12) United States Patent
Ng et al.

(10) Patent No.: US 6,285,366 B1
(45) Date of Patent: Sep. 4, 2001

(54) HIERARCHY NAVIGATION SYSTEM

(75) Inventors: Bernard Ignatius Ng, Singapore (SG);
Rong Qiang Sha, Milpitas, CA (US);
Lynn Michael Maritzen, Fremont, CA (US); Claire Jean Sponheim, Milpitas, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/107,857

(22) Filed: Jun. 30, 1998

(51) Int. Cl.[7] .................................................. G06F 9/00
(52) U.S. Cl. ................................. 345/356; 345/339
(58) Field of Search ........................ 345/339, 340, 345/342, 348, 353, 356, 357

(56) References Cited

U.S. PATENT DOCUMENTS

| | | | | |
|---|---|---|---|---|
| 5,701,137 | * | 12/1997 | Kiernan et al. | 345/340 |
| 5,714,971 | * | 2/1998 | Shalit et al. | 345/219 |
| 5,790,121 | * | 8/1998 | Sklar et al. | 345/356 |
| 5,801,703 | * | 9/1998 | Bowden et al. | 345/357 |
| 5,805,167 | * | 9/1998 | van Cruyningen | 345/353 |
| 5,852,439 | * | 12/1998 | Musgrove et al. | 345/339 |
| 5,907,844 | * | 5/1999 | Guay et al. | 707/100 |
| 5,912,668 | * | 6/1999 | Sciammarella et al. | 345/348 |
| 5,917,492 | * | 6/1999 | Bereiter et al. | 345/357 |
| 5,943,053 | * | 8/1999 | Ludolph et al. | 345/342 |
| 5,986,657 | * | 12/1999 | Berteig et al. | 345/357 |

OTHER PUBLICATIONS

Using Windows 95, Second Edition, Ron Person, Robert Voss, et al., Jan. 1997.*

* cited by examiner

Primary Examiner—Raymond J. Bayerl
Assistant Examiner—Cao H. Nguyen
(74) Attorney, Agent, or Firm—William J. Kubida; Stuart T. Langley; Hogan & Hartson LLP

(57) ABSTRACT

A navigation system for a hierarchy of objects displayed by a computing system are rapidly navigated first by an automatic explosion module for exploding a displayed node of the hierarchy in response to a first characteristic stroke by a pointer control device while the pointer is within the boundary of the displayed node. In addition, an implosion module implodes nodes branching from a displayed node of the hierarchy in response to a second characteristic stroke by the pointer control device while the pointer is within the boundary of the displayed node. The first characteristic stroke by the pointer control device is movement of the pointer controlled by the pointer control device within the boundaries of the displayed node. The second characteristic stroke by the pointer control device is a mouse click while the pointer is within the boundaries of the displayed node or object. A keystroke module sets the level of further explosion of the node when the displayed node is exploded by the explosion module.

23 Claims, 11 Drawing Sheets

HIERARCHY NAVIGATION SYSTEM

BACKGROUND OF THE INVENTION

1. Field of the Invention

This invention relates to a navigation system for a hierarchy tree. More particularly, the invention relates to display management of and selective presentation of tree levels and tree branches in the hierarchy tree of an information system.

2. Description of the Related Art

The use of tree formats to display an object hierarchy in a computing system is quite well known. These trees typically follow a text outline format, and the outline is oriented vertically with each level of a branch positioned vertically lower and to the right on the display screen than the previous level of the branch. Thus, the tree grows from upper left to lower right on the display screen. Because of this format, the upper right portion of the display screen is wasted area, and never used to map the hierarchy being displayed.

In the known tree navigation system, objects at an outer branch level (further out on a branch) are displayed by clicking on the next inner level object. Accordingly, to move out a branch, the user must mouse click on each object along the branch to open the next outer level of the branch. For example, in Windows Explorer in the Microsoft Windows 95 program, the user must mouse click on each node of the tree to open the next branch level of the tree. Finally, the last level of the tree is displayed as objects in a folder of the previous branch level.

It is also well known to select drop down menus in a windowing system. A menu is opened by clicking on the menu name. Thereafter, an object in the menu that points to another menu will automatically open the next menu if the mouse cursor is placed on the object. Only objects pointing to further menus will open in this way, and only one menu at a next menu level may be opened at any one time.

A hierarchy navigation system is needed that has the capability to open multiple branches and display the multiple branches simultaneously. Further, a tree navigation system is needed that has the capability to explode multiple levels along a branch in one operation. Also, a tree navigation system is needed that rapidly opens branches to objects from which actions may be launched, and provides for controlled closure of selected branches.

SUMMARY OF THE INVENTION

In accordance with this invention, the above needs have been met by a hierarchy navigation system in an information processing system through the computer-implemented steps beginning with detecting movement of a mouse pointer within an object displayed on a display screen by the information processing system. Then children of the object in the hierarchy are tested as to whether they are marked visible for display on the display screen. If the testing step detects the children are not marked visible, then a marking step marks the children as visible. When the display is redrawn, the children marked visible are displayed, and thus the object is exploded.

In a further feature of the invention, a setting step sets levels of explosion for branches from the object to a selected further level or depth level for explosion when the mouse moves within an object. The default depth level is one. The marking step marks the children of the object visible to this further level of explosion indicated by the selected depth level.

In another feature of the invention, the navigation system has a step for detecting a mouse click of a mouse pointer within an object displayed on a display screen. The object clicked on is tested for whether children of the object are marked visible for display on the display screen. If this testing step detects the children are marked visible, the children are then marked invisible. Now when the display is redrawn, the children marked invisible disappear, and branches of the object are imploded into the object clicked on.

In another feature of the invention, the depth of prior explosion of an imploded node is stored. In effect the children changed from visible to invisible during implosion are remembered. If the object is then autoexploded a second time by pointer movement within the object, the object explodes to its prior depth level of explosion, and all children of the object marked invisible during implosion are again marked visible. The object is thus re-exploded to the state it was in prior to implosion.

In another feature of the invention, desensitization intervals are set to inhibit explosion of objects. An object desensitization interval inhibits the explosion of an object that has just been imploded. A global desensitization interval inhibits the explosion of any object in the hierarchy to stabilize the display.

In another feature of the invention, the hierarchy display is redrawn with all objects from a preceding display plus, or minus, the children of objects marked visible or invisible by the marking step so as to explode or implode objects of the hierarchy. Also the object, whose children have been marked visible or invisible by the marking step, is highlighted.

The above computer-implemented steps in another implementation of the invention are provided as an article of manufacture; i.e., a computer storage medium or a computer transmission medium containing a computer program of instructions enabling a computer to perform a computer process having the above-described steps.

In a machine implementation of the invention, apparatus for navigating through a hierarchy of objects in an information processing system in a computer has an explosion module for exploding a displayed node of the hierarchy in response to a first characteristic stroke by a pointer control device while the pointer is within the boundary of the displayed node. In addition, an implosion module implodes nodes branching from a displayed node of the hierarchy in response to a second characteristic stroke by the pointer control device while the pointer is within the boundary of the displayed node. The first characteristic stroke by the pointer control device is movement of the pointer controlled by the pointer control device within the boundaries of the displayed node. The second characteristic stroke by the pointer control device is a mouse click while the pointer is within the boundaries of the displayed object. A keystroke module sets the depth or level of further explosion of the node when the displayed node is exploded by the explosion module.

The great advantage and utility of the present invention is that nodes of a tree in a hierarchy of objects may be rapidly exploded by sweeping a mouse pointer through nodes, or objects, of the tree. Further, the number of levels of further explosion may be controlled. Also, the action to explode nodes is a different physical action to implode branches to a node. Also, multiple nodes may be exploded simultaneously.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENT

Figure 1A:
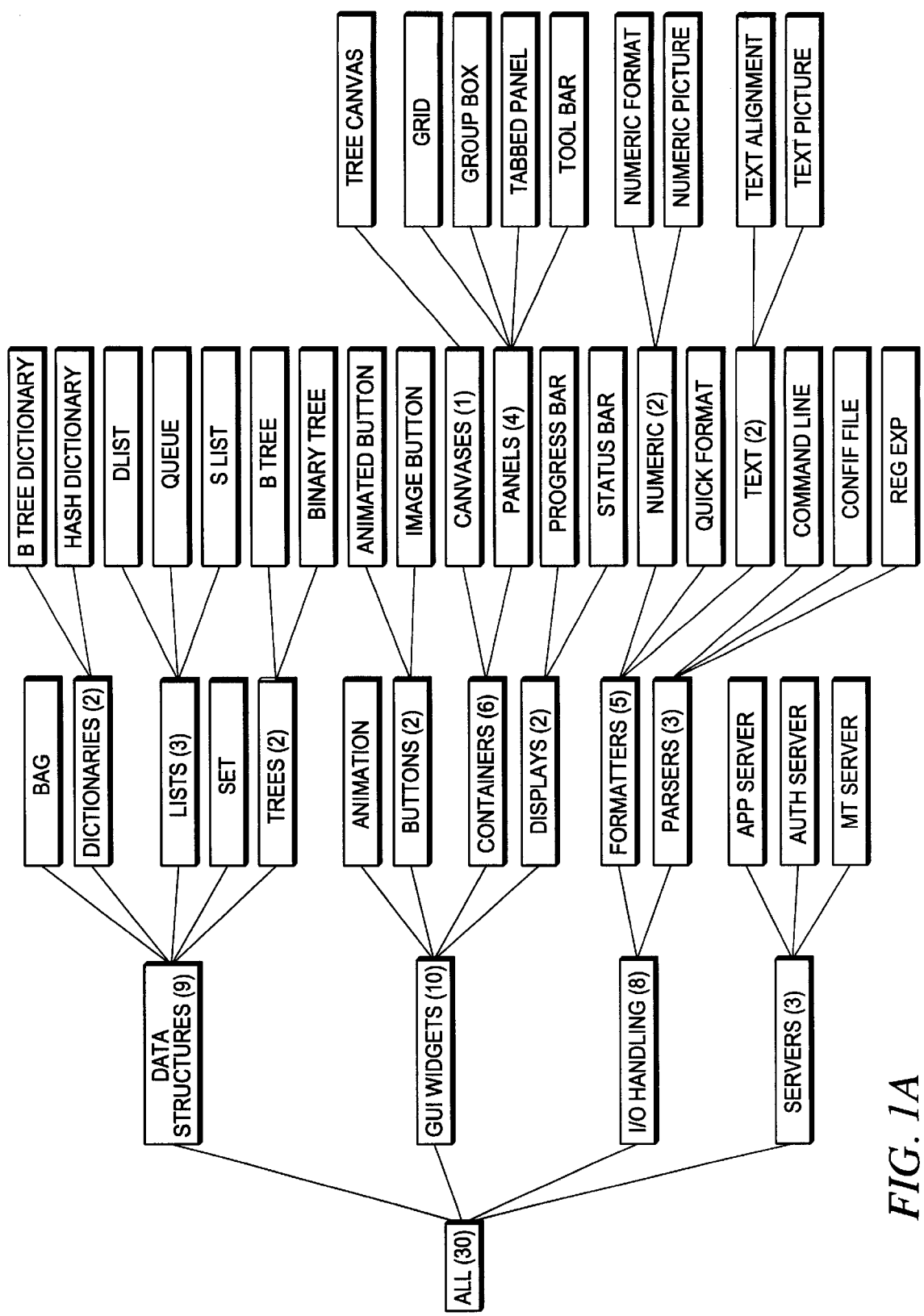
FIGS. 1A through 1D show displays of a hierarchy tree resulting from navigation through the tree in accordance with the preferred embodiment of the invention.

An example of a hierarchy to be navigated in accordance with a preferred embodiment of the invention is displayed as a tree and is illustrated in FIG. 1A. The objects in the tree with horizontal shading such as "Data Structures" and "GUI Widgets" are nodes that have been exploded, and thus could be imploded to collapse branches of the tree. The objects with grid shading such as "Bag" and "B Tree Dictionary" are nodes that are launch objects. Each launch object is at the end of a branch. In the preferred embodiment, the tree is laid out horizontally from left to right, and fans out vertically to make optimum use of the display space for the tree. Of course, a vertical tree orientation could be used, but in any chosen tree layout orientation, the branches should fan out to fill the display space.

In FIG. 1A, the root node, labeled "All," is planted at the left side in the vertical middle of the display screen. At the next level out on the tree, there are four exploded nodes. In total, the example tree in FIG. 1A has forty-seven nodes and five levels. The levels are distributed horizontally from left to right, and the objects within a level are distributed vertically. The root node is at the first level. The second level has four subtree nodes, the third level has eight subtree nodes and six launch objects, the fourth level has four subtree nodes and fifteen launch objects, and the fifth level has nine launch objects.

The forty-seven nodes include the root node, sixteen subtree nodes and thirty leaves (launch objects). The parenthetical number in the root node and the subtree nodes indicates the number of launch objects that may be reached through that node. For example, the root node, and therefore the tree, has thirty leaves or launch objects, and the subtree node labeled "I/O Handling" has eight leaves. The configuration of the example tree is not part of the invention, and it will be apparent to one skilled in the art that the invention may be used with other hierarchy layouts indicating the relationship between objects in the hierarchy. With the example tree in FIG. 1A, the operation of the preferred embodiment of the invention will be described.

To illustrate how a user operates the navigation system in an embodiment of the invention, we will assume that the initial display of the tree was the unexploded root node "All." The user explodes the root node of the tree to the next level by moving the mouse pointer across the root node. This will produce the display illustrated in FIG. 1B. The root node has been autoexploded one further level from the root node by sweeping the mouse pointer across the root node. The explosion is triggered by movement of the mouse pointer within the root node object's rectangular boundaries on the display. The depth of explosion to further levels has a default value of one. The depth of explosion may be changed by the user selecting an option to change depth and keying a numerical keystroke.

Figure 1C:
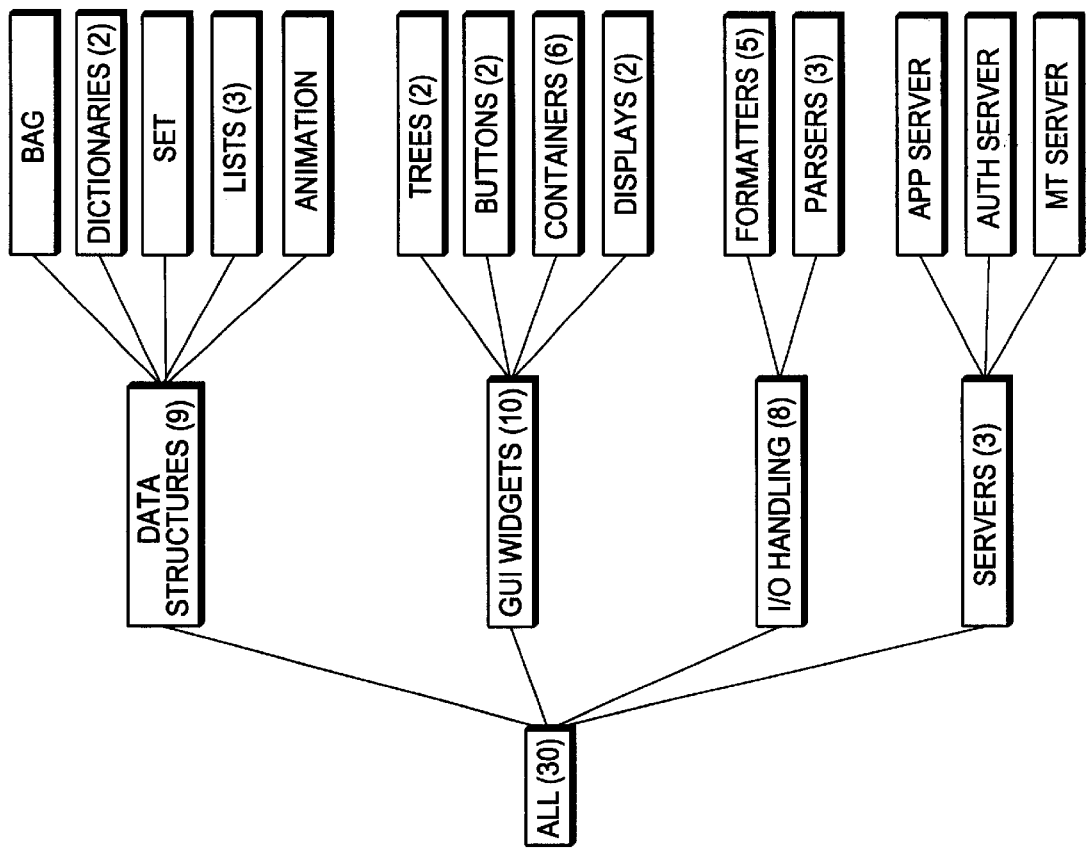

The root node is painted an "exploded" color different from the "unexploded" color of four subtree nodes at the next level. Alternatively, exploded and unexploded nodes could be given different shadings or shapes. The four subtree nodes at level two have an unexploded color to indicate that they may be exploded to expose further branches of the tree. If the mouse is then moved so that the mouse pointer sweeps across the four subtree nodes in FIG. 1B, those nodes will be exploded one further level. The displayed tree will now appear as illustrated in FIG. 1C. In FIG. 1C, the root node and the four subtree nodes at the second level have now been exploded so they are painted with the exploded color. At the third level, there are subtree nodes painted with the unexploded color and launch nodes painted with a third color, the launch color. Launch nodes are also referred to herein as leaves.

Figure 1B:
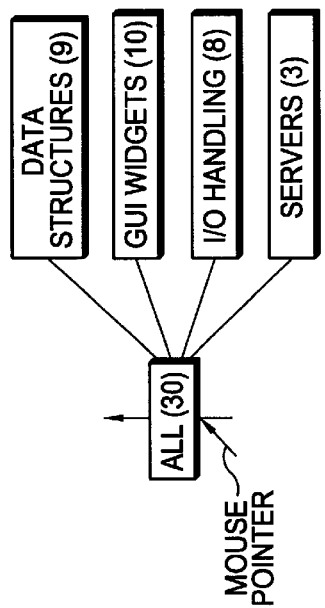
Figure 1D:
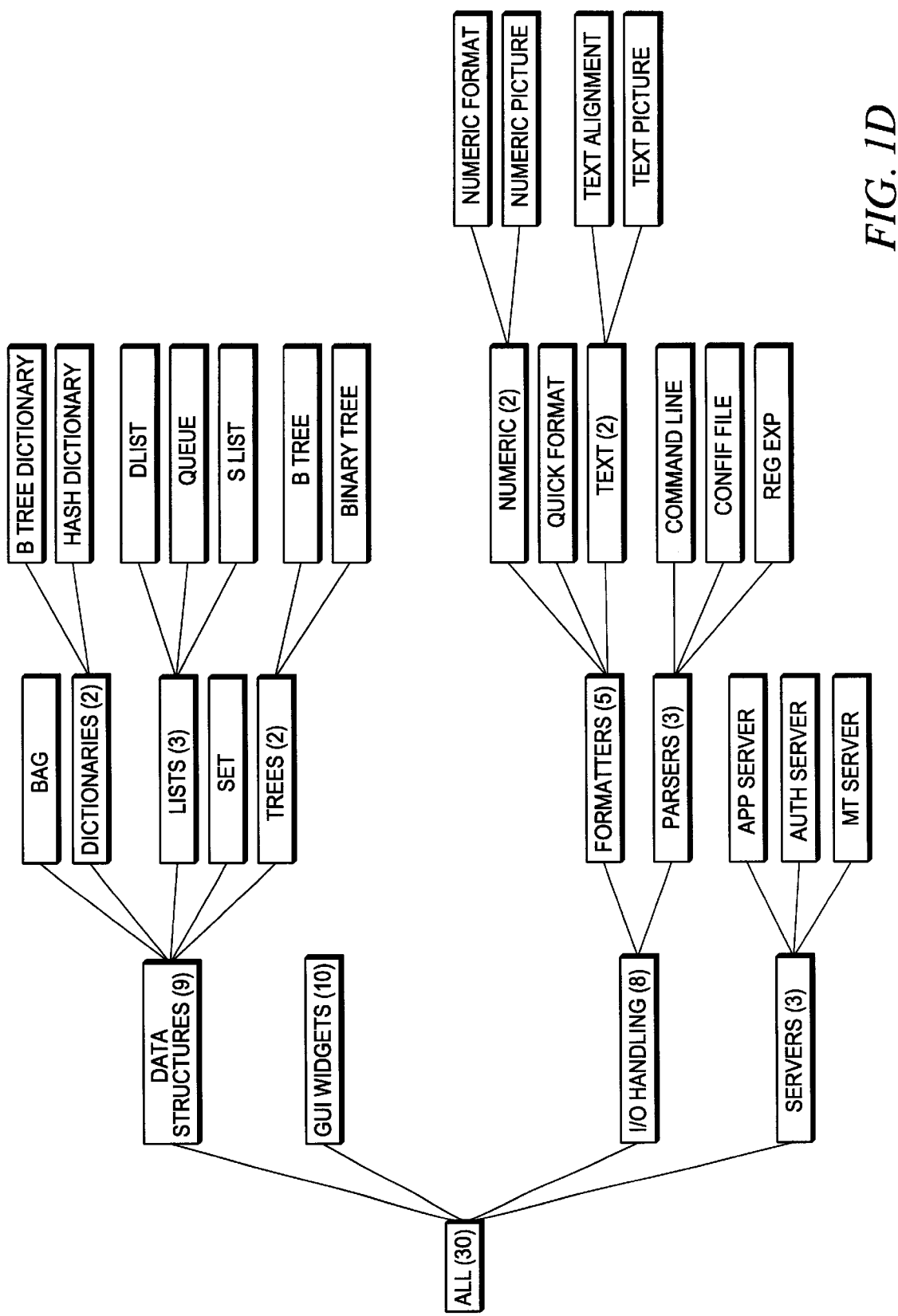

If the operator changes the depth level to three and sweeps the pointer across the objects in FIG. 1B labeled "Data Structures," "I/O Handling" and "Servers," then the tree would be redrawn and displayed as shown in FIG. 1D. In FIG. 1D, swept objects have been exploded three further levels. The only unexploded color node in FIG. 1D, indicating it is the only remaining unexploded node, is the node labeled "GUI Widgets." Changing the depth level for the number of further exploded levels to three was sufficient to complete the branches stemming from objects labeled "Data Structure," "I/O Handling" and "Servers" when those nodes were swept by the pointer.

While a deeper depth level more rapidly explodes the tree, a default depth level of "one" is preferred as it allows the user to rapidly sweep through a tree traveling along a branch of the tree. To navigate through a branch of a hierarchy, the mouse pointer is just swept through nodes along the desired branch. After a launch object is reached at the end of a branch, the action configured (described hereinafter) for the launch object is launched by mouse clicking on the launch object.

In the event a branch of the hierarchy has been opened and is not wanted, the branch may be imploded by mouse clicking on a node in the branch. The branches further out from the node, that is mouse-clicked, will implode or collapse into that node. For example, if the entire tree was displayed as in FIG. 1A, a mouse click on the object labeled "GUI Widgets" would implode the branches stemming from that object and produce the tree as displayed in FIG. 1D.

Attributes are stored in memory for each object. These attributes include the number of children, or nodes, under the object. The number of nodes includes the number of subtree nodes and the number of leaves under the object. In FIGS. 1A–1C the number of leaves were displayed in each unexploded object. Alternatively, the number of children, or subtree nodes, could have been displayed in parenthesis in the unexploded objects. Additional attributes stored with each object are a flag to indicate if the object is visible, a flag to indicate if the children are visible and an indicator of the depth of explosion (number of levels visible). Finally, each time the tree is laid out, the X, Y coordinates and height and width of the object boundaries are stored with each object.

The physical embodiments of the invention described hereinafter are implemented as logical operations in a distributed processing system, having client and server computing systems, or in a standalone computing system. The logical operations of the present invention are implemented (1) as a sequence of computer-implemented steps running on the computing system, and (2) as interconnected machine modules within the computing system. The implementation is a matter of choice, dependent on the performance requirements of the computing system implementing the invention. Accordingly, the logical operations making up the embodiments of the invention described herein are referred to variously as operations, steps or modules.

Figure 2:
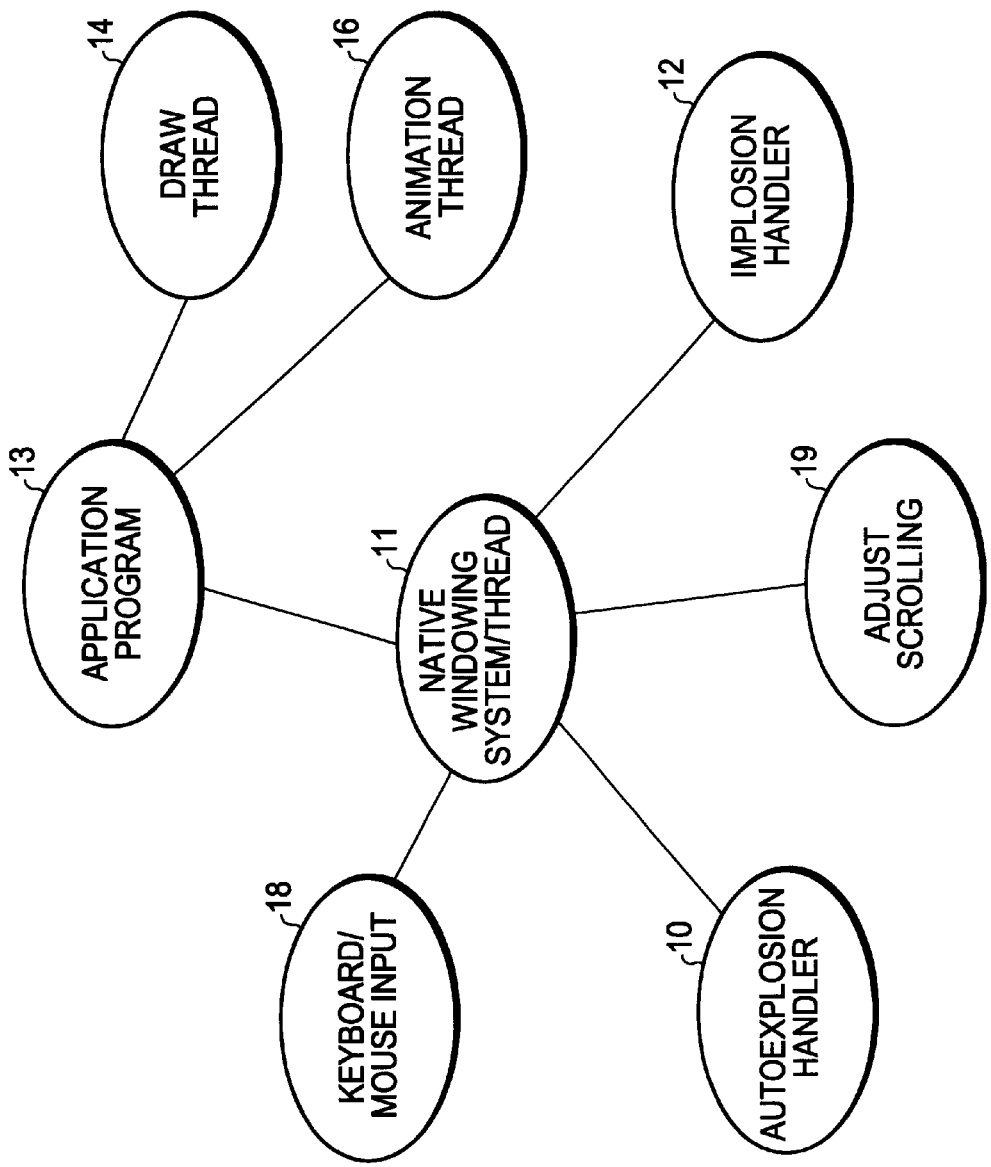
FIG. 2 is a system schematic illustrating a preferred embodiment for the navigation system.

In the preferred embodiment of the invention, the navigation system is implemented as a multi-threaded program as illustrated in FIG. 2. An autoexplosion event handler 10 performs operations to explode nodes in the tree and resides in the native windowing system thread 11. An implosion event handler 12 performs operations to implode branches into a node and also resides in the windowing system/thread. An application program 13, when it is launched, creates a draw thread 14 and an animation thread 16. After the application program is launched, the application turns control over to the windowing thread. The draw thread and animation thread continue to run waiting for tasks from the autoexplosion handler and implosion handler in the windowing thread. The draw thread 14 draws the tree for display by the computing system, and the animation thread 16 temporarily highlights an imploded or exploded node. In addition, there is keyboard/mouse input 18 to provide user controlled information to the windowing thread. There is also an adjust scrolling routine 19 in the windowing thread to scroll the tree canvas, when the canvas is larger than the window, to keep the mouse pointer within the window during explosion and implosion. Canvas refers to a virtual display area large enough to contain the hierarchy tree; the canvas may extend beyond the X,Y boundaries of the display window. The autoexplosion handler and the implosion handler are described in detail hereinafter with reference to FIGS. 4 and 5. The draw thread and the animation thread are described in detail hereinafter with reference to FIGS. 6 and 7. The adjust scrolling operations are described in detail hereinafter with reference to FIG. 9.

The operating environment, in which the present invention is used, encompasses a stand-alone computing system, as well as a general distributed computing system. In the distributed computing system, general purpose computers, work-stations, or personal computers are connected in a client-server arrangement via communication links of various types, wherein programs and data, many in the form of objects, are made available by various members of the system.

Figure 3:
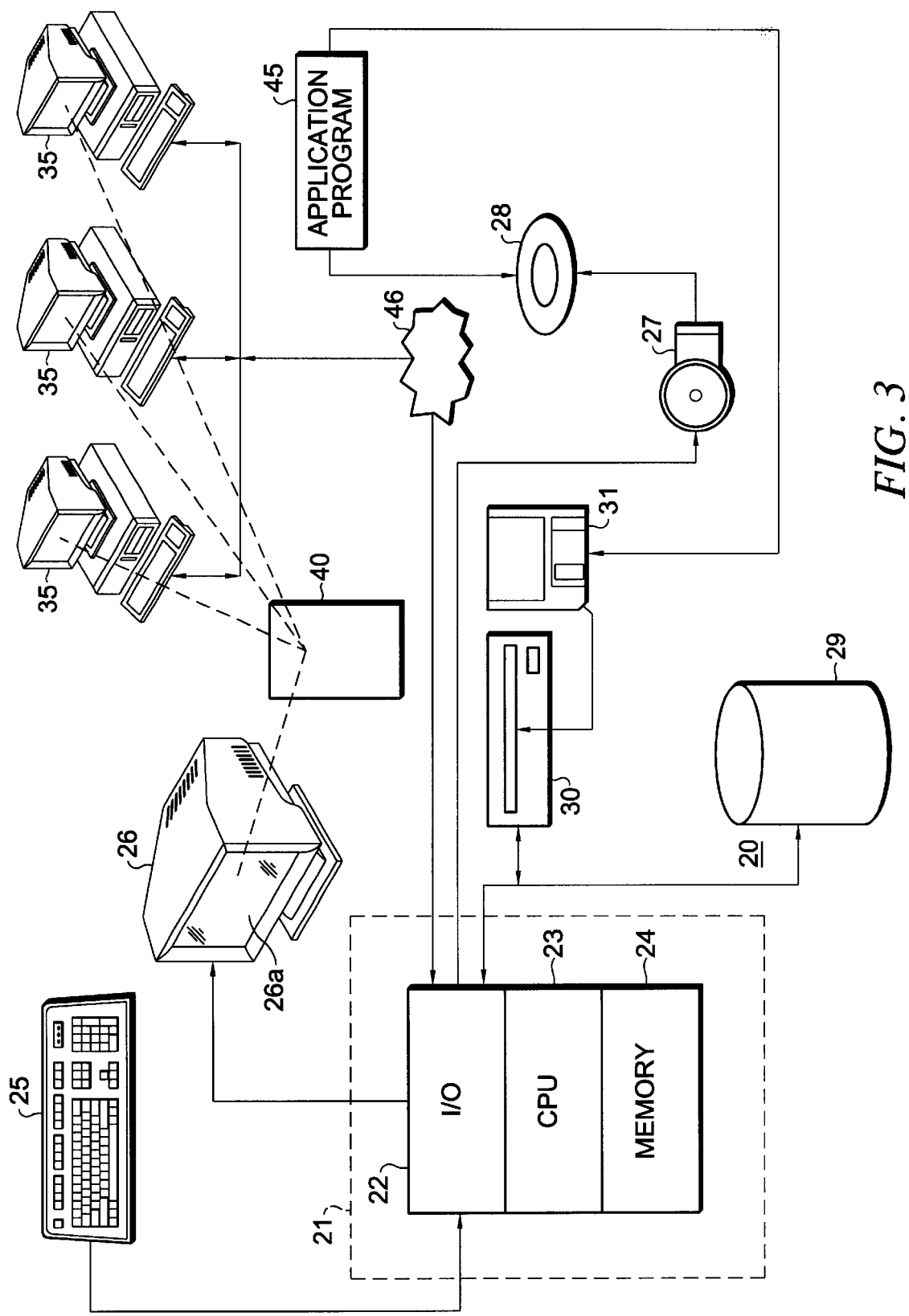
FIG. 3 illustrates a distributed processing computer system with a server and multiple clients connected in a communications network to perform the logical operations of the invention.

Some of the elements of a stand-alone computer, or a general purpose work-station computer, are shown in FIG. 3. In accordance with the invention, users at remote work-stations in a network, such as client processors 35, communicate through the network to a computer server 20. Server 20 includes processor 21 having an input/output section 22, a central processing unit 23, and a memory section 24. The input/output section 22 is optionally connected to a keyboard 25, a display or monitor 26, and a disk storage unit 29. The input/output unit 22 includes a communications adapter (not shown) for communicating on the network 46 to the remote client stations 35.

Application programs 45 operate on client station 35 which may access, or modify, files maintained by server 20. The computer program products to implement the apparatus and methods of the present invention may reside in the memory section 24, or on the disk storage unit 29 or similar storage media (not shown), or reside on storage mediums used by clients 35. Examples of computing systems that may be used as either a server 20 or a client 35 include the SPARC systems offered by Sun Microsystems, Incorporated, personal computers offered by IBM Corporation and by other manufacturers of IBM-compatible personal computers and systems running the JAVA OS[1], UNIX[1], OS/2[2], HP-UX, AIX[3], and DOS, operating systems.

[2] UNIX is a trademark Licensed by X/Open Company Ltd.
[3] OS/2 and AIX are trademarks of IBM Corporation.

As shown in FIG. 3, client 35 and server 20 communicate over network 46 which provides client 35 with access to the files maintained on disk 29 of the server. Conversely, client 35 also transfers file data over network 46 for files maintained on the server.

Figure 4:
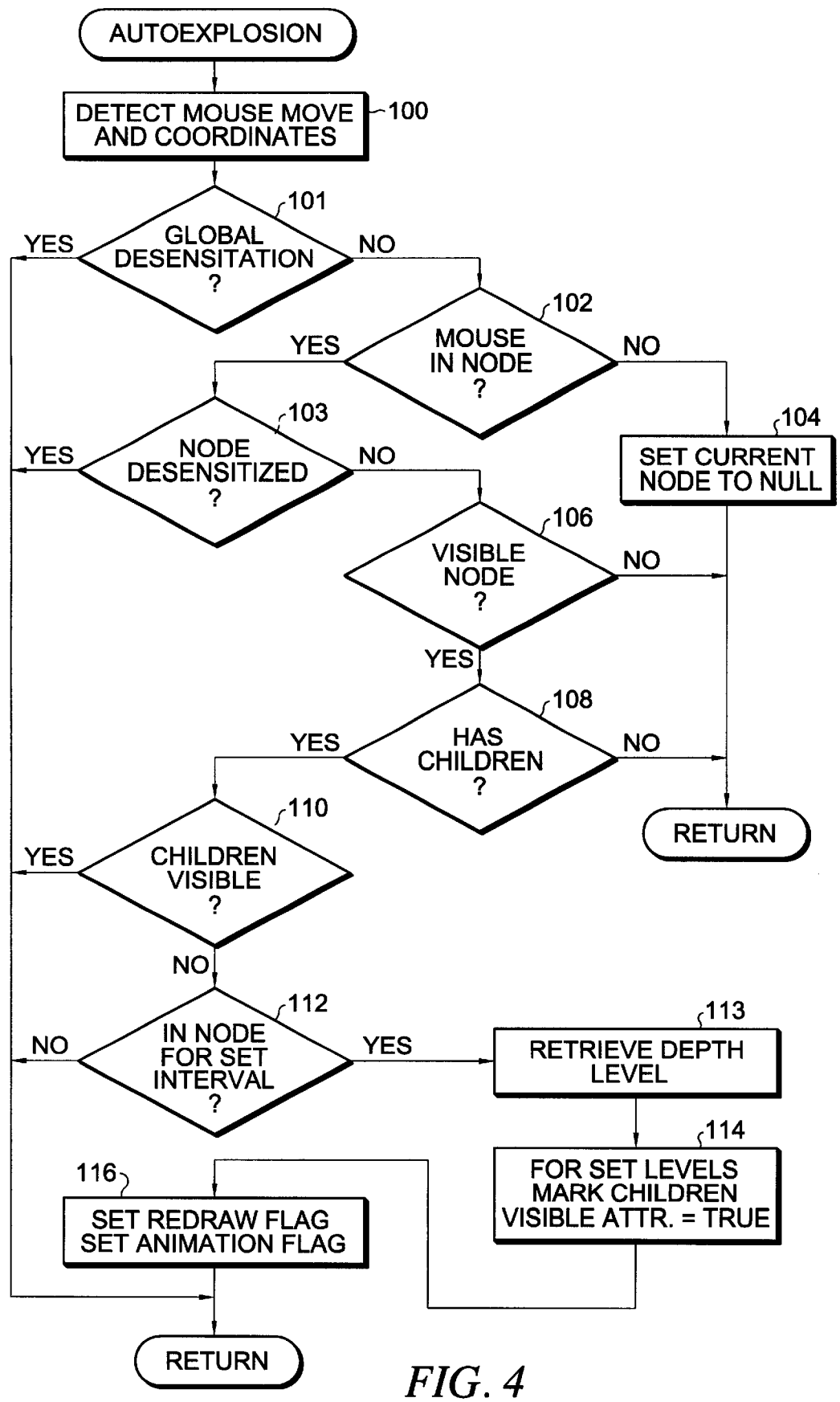
FIG. 4 illustrates the autoexplosion handler to explode further branch levels from a node when navigating the hierarchy.

FIG. 4 shows the logical operations to perform automatic explosion of an object, or node of the tree, into branches. "Object" and "node" are used interchangeably in this description as a node of the tree is displayed as an object rectangle. The logical operations begin at operation 100 which detects that a mouse move (i.e., mouse pointer move), has occurred, and also detects the X and Y coordinates of the mouse pointer location when it moves. Decision operation 101 detects whether a global desensitization interval is active. If the mouse move is detected during such an interval, explosion of all nodes in the tree is inhibited so the operation flow exits to the supervisor. If the global desensitization interval is not active, then decision operation 102 tests whether the mouse move occurred in an object or node rectangle on the display screen. If the mouse move was not within the range of coordinates of the boundaries of an object, the operation flow branches NO to operation 104. Operation 104 sets the current node value to null. Then the operation flow exits the autoexplosion handler. If the mouse movement did occur within the boundaries of a node, the operation flow branches YES from decision operation 102 to decision operation 103. Decision operation 103 tests whether the node, within which the movement is detected, has a node desensitization interval set. If the node has been desensitized, explosion of the node is inhibited. If the node has not been desensitized, the operation flow branches NO to decision operation 106.

Decision operation 106 detects whether the mouse is in a visible node. If the node is not a visible node, the operation again exits, or returns, to a supervisor or control program for the multiple threads in the navigation system. If the mouse movement is in a visible node, the operation flow branches YES to decision operation 108 to detect whether the visible node has children. When operation 108 detects that the visible node has no children, the automatic explosion routine exits. When decision operation 108 detects that there are children, the flow branches YES to decision operation 110.

Decision operation 110 is detecting whether the children are visible. If the children are visible, then no action is necessary, and the operation flow branches YES from operation 110 to return to the windowing thread. If the children are not visible, then operation flow branches NO from decision 110 to decision operation 112.

Decision operation 112 is testing whether the movement within a node range (object rectangle boundaries) has been detected for a set time interval. This is done because the navigation system in this preferred embodiment of the invention is multithreaded, and a redraw of the tree by the redraw thread might change the position of the node in an interval of time shorter than a set interval. Accordingly, if the movement hasn't been within the node for the set interval, the operation flow branches NO from decision operation 112, and the autoexplosion routine exits, or returns, to the windowing thread. If the mouse movement detected stays within the node range for a set interval, the operation flow branches YES to retrieve depth module 113. Retrieve depth module 1 13 sets the depth level to the default value, "one," unless an optional depth level has previously been entered by the user.

Operation 114 then sets the children visible attribute to TRUE for children of the node down through the depth level, i.e. number of further explosion levels, retrieved by retrieve module 113. The visible attribute is used by the draw thread in laying out the tree as will be described hereinafter with reference to FIG. 6. Operation 116 is the last operation in the autoexplosion thread and sets a draw flag for the draw thread and an animation flag for the animation thread. The autoexplosion handler then exits to the windowing thread.

The windowing thread queues records of mouse movement. Therefore, when the autoexplosion handler returns control to the windowing thread, it will restart if there is a detected mouse movement in queue. Each mouse movement is stored in the queue, along with the X,Y coordinates of the location of the detected movement and a time stamp to indicate when the movement occurred. The time stamp is used in determining duration of intervals of movement or intervals of location of a mouse pointer within X,Y boundaries such as the boundaries of a node or object.

Figure 5:
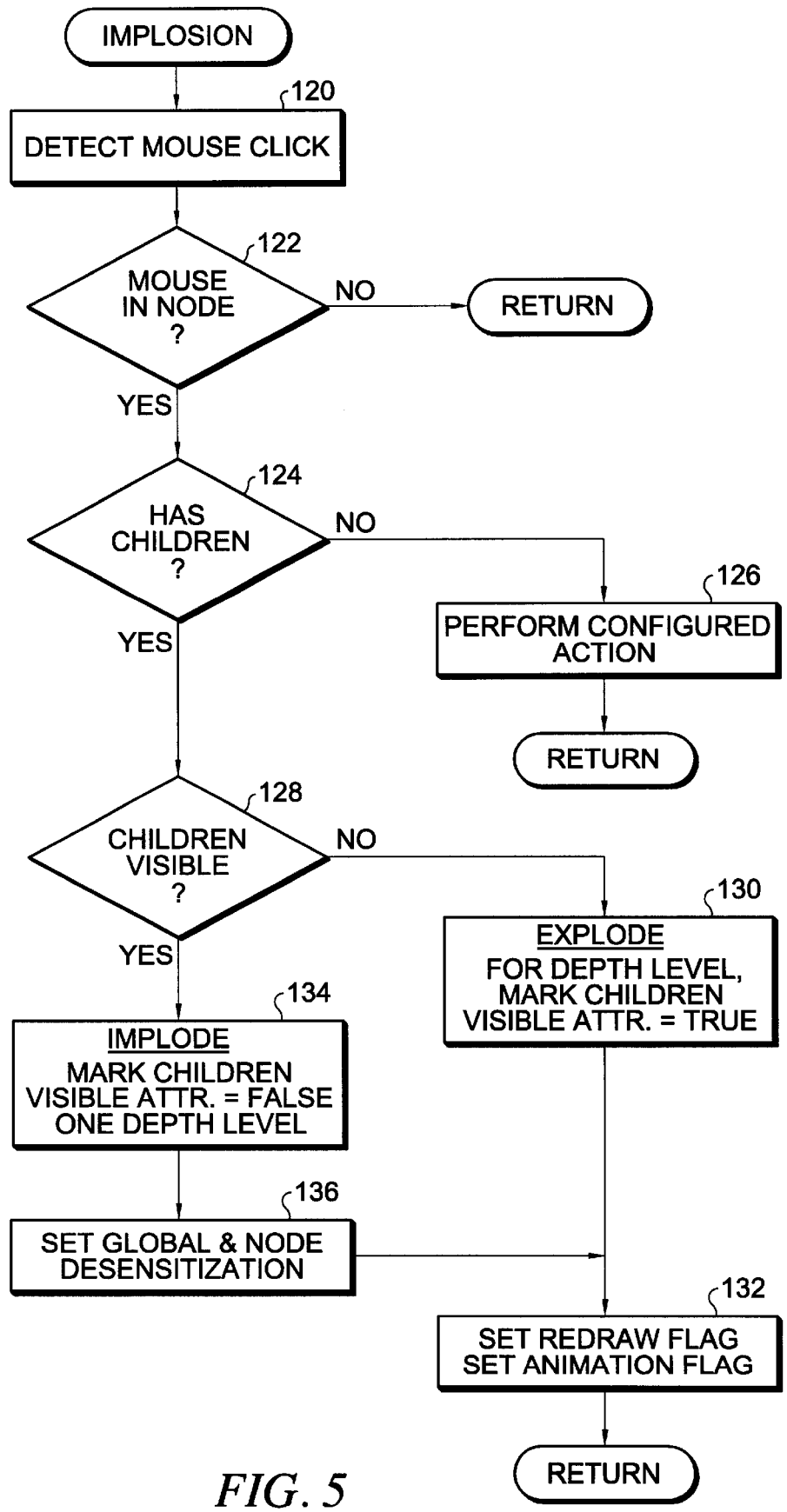
FIG. 5 shows the implosion handler to implode further branch levels into a node when navigating the hierarchy.

In FIG. 5, the logical operations for the implosion module are shown. The implosion module begins by detecting a click of the mouse button at operation 120. Decision operation 122 then tests whether the mouse was inside the rectangular range, i.e. boundaries, of a visible node when the click occurred. If not, then logical operation flow branches NO and returns to the windowing thread. If YES, then flow branches to decision operation 124 to test whether the node has children. If the node has no children, then it is an action or launch node, and the process branches NO to operation 126. Operation 126 performs the action configured for that launch node. This action might be to launch another window with yet a further tree, it might be to open an application program, it might be to go to another web site, or it might be to display further information. Any number of possibilities for this action object will be apparent to those skilled in the art. If the node does have children, the operation flow branches YES to decision operation 128.

Decision operation 128 is detecting whether the children are visible. If the children are not visible, the flow branches NO to explode module 130. The children might not be visible where the autoexplode routine is not on, or where the depth level for explosion for the autoexplode routine did not explode all children nodes. In any case, if all the children through the depth level are not visible, explode module 130 marks the visible attribute TRUE for children through the default depth level or set depth level of explosion. After the explode module 130, the operation flow passes to operation 132 which sets the redraw flag and the animation flag.

If decision operation 128 detects that children are visible, then the operation flow branches YES to the implode module 134, marks the visible attribute FALSE for the first level of children past the node. This has the effect of blocking the draw thread from drawing branches past the node. In the next redraw of the tree, the branches from the node are imploded back into the node. After the implode module 134, operation 136 sets the global desensitization and node desensitization. Global desensitization desensitizes all nodes of the tree from being imploded or exploded for a set interval of time. In one embodiment, this interval is chosen as two seconds. The criteria for setting the global desensitization time interval depends on preserving the form of the tree for a minimum interval before an autoexplosion is allowed to occur again. The node desensitization is set for a longer interval than the global desensitization. In another embodiment, node desensitization is set for four seconds. The presumption is that if the user has imploded a node, then movement within the node should not immediately cause the node to autoexplode again. The four-second interval is chosen to allow the user time to move the cursor outside the node boundaries or to let go of the mouse. The global and node desensitization intervals can be reprogrammed depending upon the desires of the user. After the desensitization is set in operation 136, the operation flow proceeds to operation 132 to set the redraw flag for the draw thread to draw the tree with the node imploded. Operation 132 also sets the animation flag for the animation thread. The animation thread will animate the imploded node to highlight the node.

Figure 6:
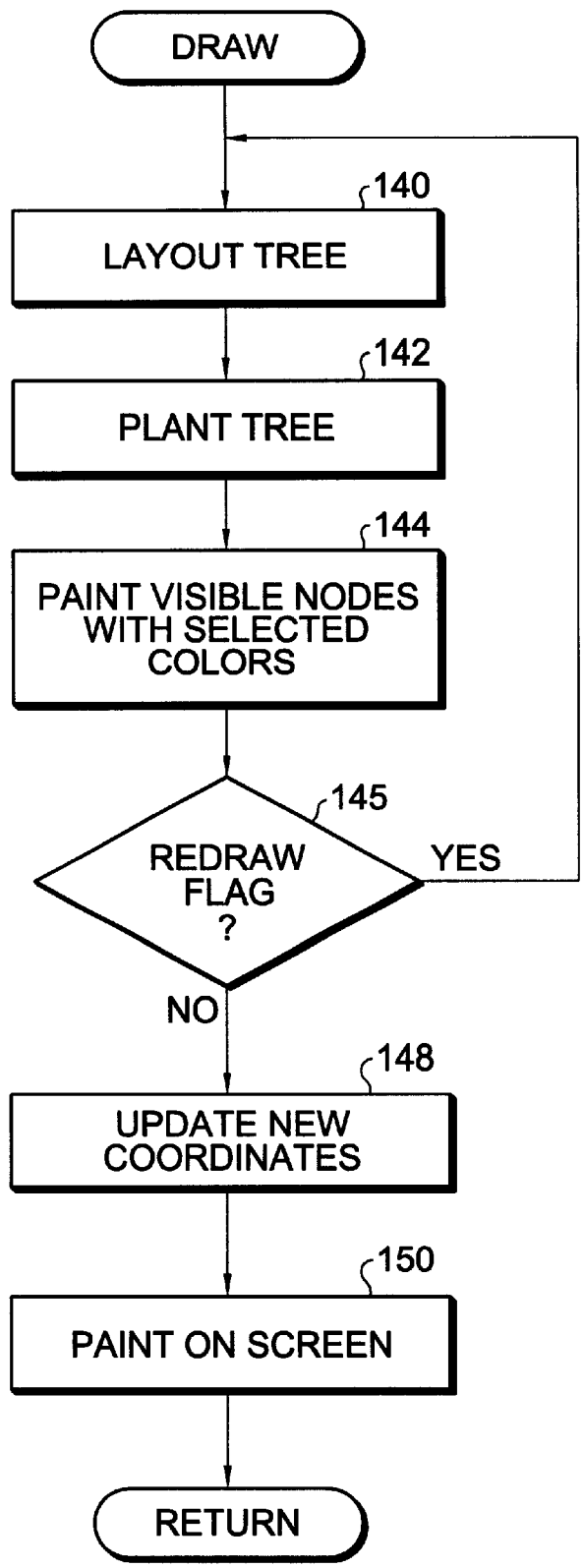
FIG. 6 shows the draw thread that draws and redraws the tree.

For the draw thread, the logical operations are illustrated in FIG. 6. The draw thread initially displays the root node of the tree and thereafter, redraws the tree each time a redraw flag is received from the autoexplosion or the implosion handler. The computer display utilizes a double-buffered screen display technique. One buffer is the image for the current display, and is called the ON screen buffer. The second buffer is the OFF screen buffer on which the next, or new, image for the screen is being drawn. Accordingly, the draw thread works on the OFF screen buffer. The draw thread begins at operation 140 which is the layout tree module. In this module, the tree is laid out based upon the number of nodes in the tree, the desired orientation of the tree, and the separation and spacing of the branches and various levels of branches. Any number of tree layout algorithms may be selected. In one embodiment, the layout algorithm should efficiently construct the tree to use all of the display screen or canvas to fit the tree on the screen if possible and if not possible, to fit the tree on the smallest canvas. The tree branches will be constructed from the root outward to nodes with visible attribute marked TRUE. The layout of each branch is stopped when the branch reaches a node with visible attribute marked FALSE. After the layout module 140 has laid out the dimensions of the tree, the plant tree module 142 calculates the X,Y coordinates of the root node. With the X,Y coordinates of the root node known, the other node coordinates and the rectangular space for each node of the tree may be calculated.

The paint module 144 then paints the visible nodes with the selected colors to indicate the state of the node. Alternatively, module 144 might change shading of node or shape of node to indicate state. In one embodiment of the invention, imploded nodes are given a first color, such as green, meaning that they may be exploded. Exploded nodes are given a second color, which in the preferred embodiment is the background control panel color of the window, to indicate that they have been previously selected. Finally, launch nodes, or action nodes, at the end of a branch are given a third color, such as yellow, to indicate that these nodes, when mouse clicked, will launch a configured action.

After the paint module 144, decision operation 146 checks for a redraw flag. If a redraw flag has been received from the explosion or the implosion handler, then the operation flow returns to the layout 140 to again lay out the tree. If a redraw flag has not been received, then the operation flow passes from decision operation 146 to the update operation 148. Update operation 148 updates the coordinates of the visible nodes to the new values. When update operation 148 is complete, then operation 150 will transfer the contents of the OFF screen buffer to the ON screen buffer, resulting in the tree being redrawn on the computer display screen.

Figure 7:
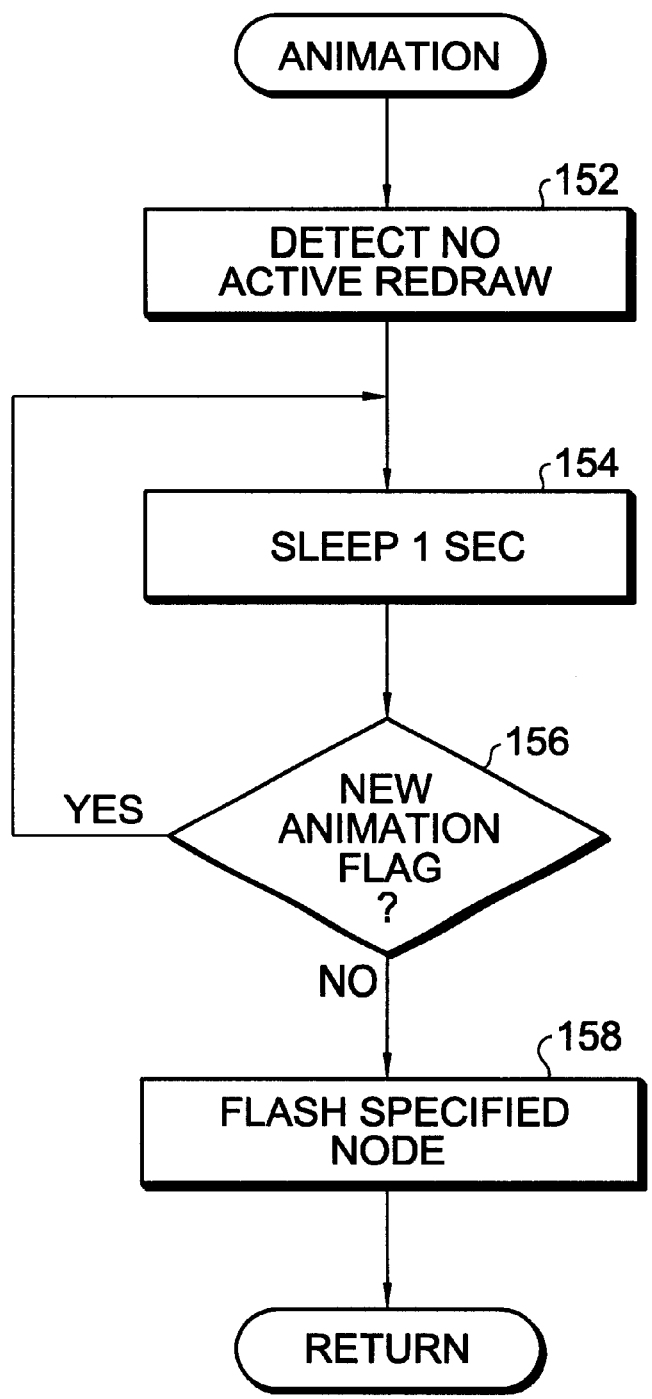
FIG. 7 illustrates the animation thread for animating exploded or imploded nodes.

The animation thread for highlighting imploded or exploded nodes has the logical operations depicted in FIG. 7. The animation routine is entered when an animation flag is received from the autoexplosion or the implosion handlers. Operation 152 detects if there is no active redraw being performed by the draw thread. In operation 154, the animation thread sleeps for one second before testing for another animation flag in decision operation 156. If an animation flag is detected, the operation flow branches YES, and returns to sleep step 154 for another one second interval. If an animation flag is not detected by decision operation 156, then the specified node associated with the most recent animation flag is flashed. The flash module 158 changes the color of the specified node amongst two or three colors for a brief interval to enable the user to quickly find the exploded or imploded node. Alternatively, module 158 might animate the node by blinking it on or off, changing its shape, or otherwise changing its appearance briefly.

Figure 9:
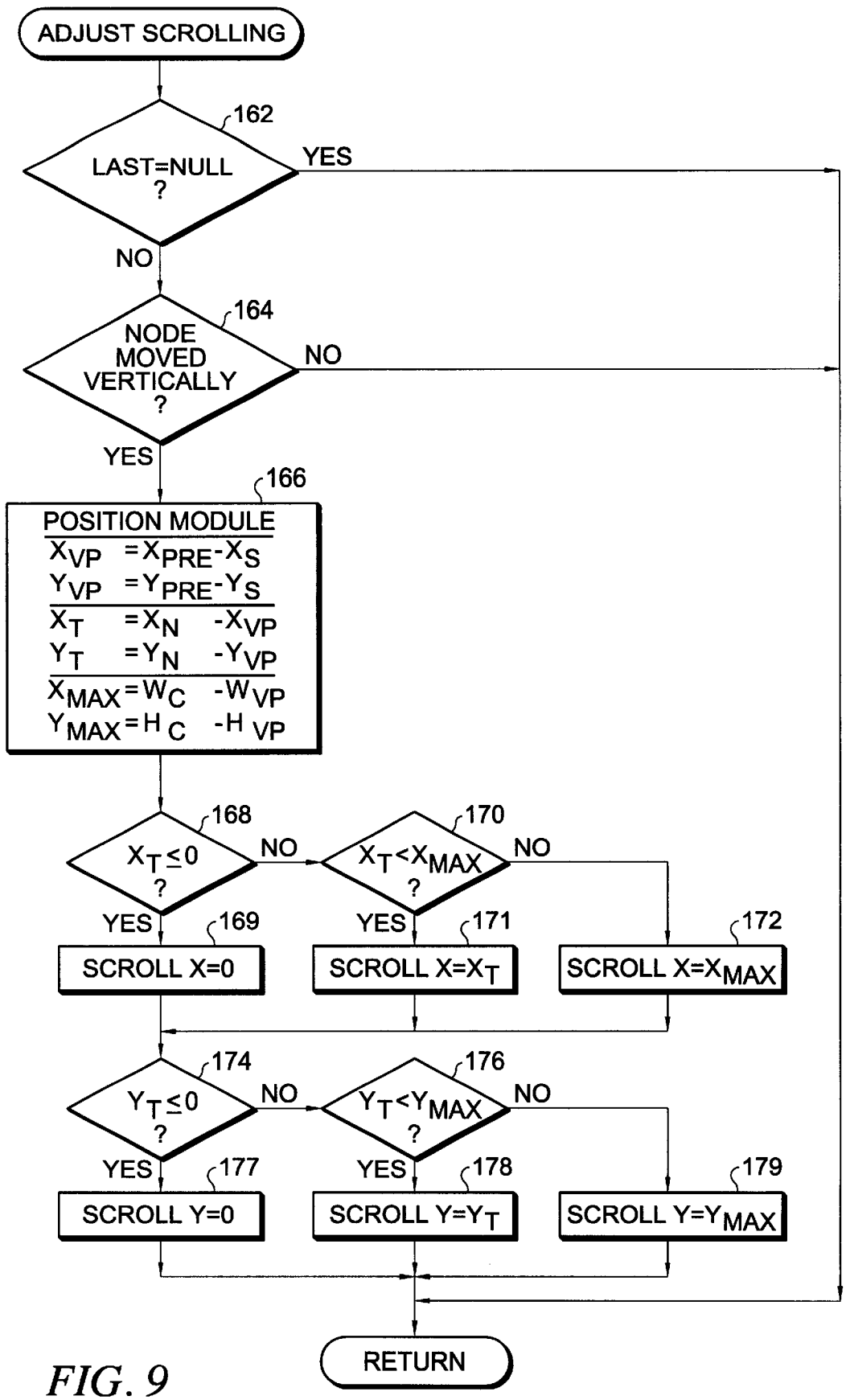
FIG. 9 shows the adjust scrolling operations to scroll the window to include exploded or imploded mode.

An additional task of the windowing thread is to adjust the window position and thus the scroll bar in situations where the imploded or exploded tree is larger that the window. FIG. 9 illustrates the logical operation necessary to scroll the window to display exploded or imploded nodes. In the description of FIG. 9, canvas refers to the virtual display area large enough to contain the hierarchy tree as imploded or exploded. View port refers to the X, Y boundaries of the display window in which a portion of the tree on the canvas is displayed on screen. An additional purpose of the adjust scrolling operation is to keep the pointer within the display window after an implosion or explosion of a node.

The adjust scrolling logical operations in FIG. 9 begin at decision operation 162. Decision operation 162 is detecting whether the last node manipulated was either imploded or exploded. If the last node condition is null, then there was no explosion or implosion, and the routine is bypassed. If the last node was imploded or exploded, then the logical operations branch NO to decision operation 164. In the preferred embodiment, the tree layout is redrawn in such a way that an imploded or exploded node does not move horizontally. However, the imploded or exploded node may move vertically. Thus, decision operation 164 is detecting whether the imploded or exploded node moved vertically. If it did not move, then no adjustment is necessary and the logical operation flow returns to the windowing thread. If the node did move vertically, the position of the canvas relative to the view port must be adjusted to keep exploded/imploded node and the pointer within the view port.

When logical operations branch YES from decision operation 164 to position module 166, position module 166 determines the position of the mouse pointer on the canvas before movement of a node due to implosion or explosion. The X coordinate of the pointer in the view port, $X_{vp}$ is equal to the X position of the node before it imploded or exploded, $X_{PRE}$, minus the X position scroll bar, $X_S$. Similarly, the Y position of the mouse pointer is the Y position of the node before implosion or explosion less the Y position of the scroll bar.

Position module 166 also determines the target X and Y positions for the pointer which are denoted by coordinates $X_T$, $Y_T$. These target coordinates are determined by taking the new coordinates of the node after implosion or explosion which are denoted $X_N$ and subtracting the X, Y coordinate position of the mouse in the view port denoted $X_{VP}$ and $Y_{VP}$.

Finally, position module 166 also determines the maximum X and Y scroll movement that is possible. The maximum movement is denoted $X_{MAX}$ and $Y_{MAX}$. For each dimension the maximum movement is the width of the canvas minus the width of the view port. Thus, the maximum X dimensional movement is equal to the width of the canvas minus the width of the view port.

After the position module 166 has determined the above positions and maximum movements, the coordinates of the X and Y target positions are tested against the maximum movement. Decision operation 168 tests whether the horizontal target is less than or equal to zero. If the answer is YES, the canvas is scrolled to X equals zero by operation 169. If the answer is NO, then decision operation 170 tests whether the horizontal target is less than the maximum horizontal scroll possible. If it is less than the maximum scroll possible, the canvas is scrolled to the horizontal target, $X_T$ by step 171. If it is greater than the maximum scroll possible, the canvas will be scrolled the maximum distance by step 172. Similarly, the vertically target position $Y_T$ is tested against zero in decision operation 174 and against maximum vertical scroll in decision operation 176. If the target is less than or equal to zero, the canvas is scrolled to vertical zero position by step 177. If the target vertical position is greater than zero and less than $Y_{MAX}$, the canvas is scrolled to the vertical target $Y_T$ by operation 178. If the vertical target is greater than $Y_{MAX}$, the canvas is scrolled the amount equal to $Y_{MAX}$ by operation 179.

Figure 8:
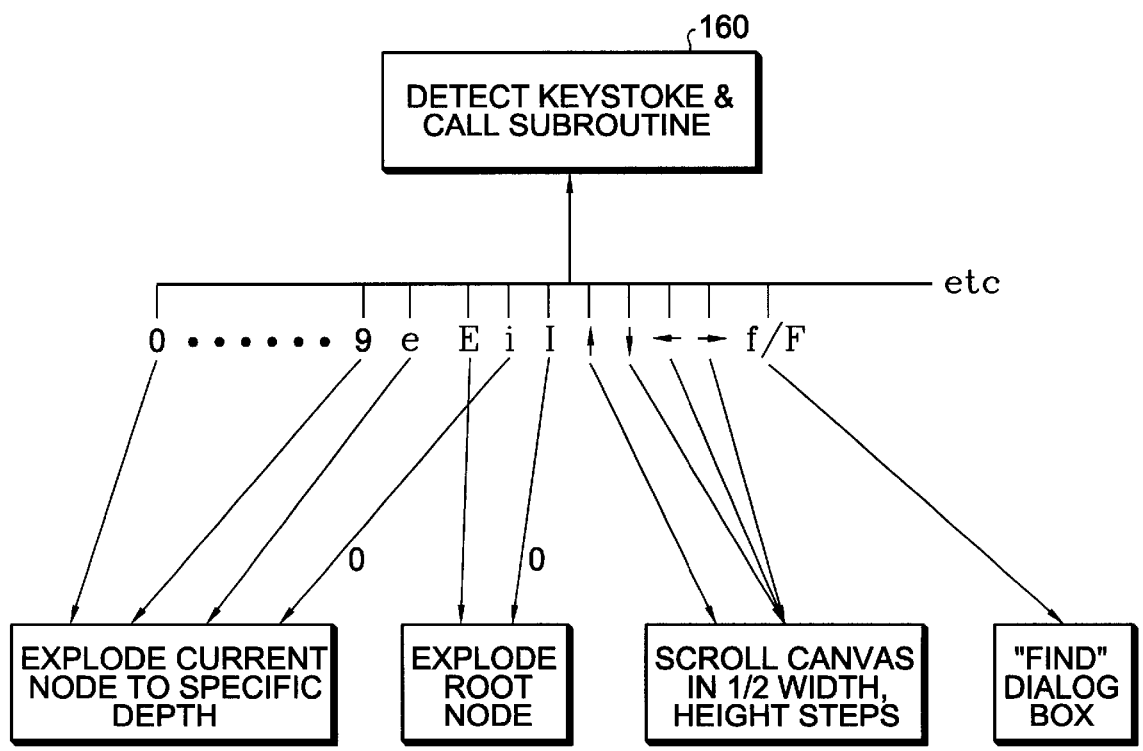
FIG. 8 illustrates keystroke controls for setting levels and modifying operations of the autoexplosion and implosion event handlers and the draw thread.

In FIG. 8, some examples of keystroke control of the navigation system are depicted. When a keystroke is detected by operation module 160, subroutines are called to perform the functions depicted in FIG. 8. The numeric keystrokes may be used in two ways. First, if the user selects an option to change the depth, numeric keys 0 through 9 will control the levels, or depth, of explosion in the autoexplosion handler. Second, as another feature of the invention, a numeric keystroke autoexplodes a node to the depth level of the key value if the mouse pointer is resting on a visible node when the key is struck. Thus, for example, if the keystroke "3" is struck while the mouse pointer is resting on GUI Widgets in FIG. 1D, the GUI Widgets node is exploded three levels and the displayed tree changes from its appearance in FIG. 1D to its appearance in FIG. 1A.

As another feature of the preferred embodiment of the invention, if the lower case "e" key is struck while the mouse is resting on a current visible node, then the depth level for explosion is infinity, and the current node has all nodes below it to the end of all its branches exploded. If the lower case "i" key is struck under the same conditions, then the depth level is 0 or, in effect, all visible nodes below the current node are imploded into the current node. If an upper case "E" is struck, then the explosion will be a global explosion of the entire tree; i.e., all nodes from the root node. Similarly, if the upper case "I" is struck, then all nodes will implode into the root node so that only the root node will be displayed.

If a scroll key is struck, then the canvas making up the entire tree or the displayed visible nodes of the tree will be scrolled one-half the window width left/right, or one-half the window height up/down, depending on the scroll key struck.

Further, if a letter "f/F", either upper or lower case is struck, a find dialog box will open, allowing the user to find a given node by name. It will be apparent to those skilled in the art that many other keystrokes or actions by other input devices might be added to modify the routines in the navigation system. One example might be the keystroke "C" causing the display to center on the current node.

A presently preferred embodiment of the present invention and many of its improvements have been described with a degree of particularity. It should be understood that this description has been made by way of example, and that the invention is defined by the scope of the following claims.

What is claimed is:

1. Apparatus for navigating through a hierarchy of objects in an information processing system in a computer, the computer having a processor, a display, a keyboard, a pointer control device for the display and a data storage device, said apparatus comprising:

an explosion module for exploding a displayed object of the hierarchy in response to a first characteristic stroke of the pointer control device while the pointer is within the boundary of the displayed object;

an implosion module for imploding nodes branching from a displayed object of the hierarchy in response to a second characteristic stroke of the pointer control device while the pointer is within the boundary of the displayed object; and a keystroke module in response to a key stroke for setting the level of further explosion of the object when the displayed object is exploded by the explosion module.

2. The apparatus of claim 1 wherein the first characteristic stroke of the pointer control device is movement of the pointer controlled by the pointer control device within the boundaries of the displayed object.

3. The apparatus of claim 1 wherein the second characteristic stroke of the pointer control device is a mouse click while the pointer is within the boundaries of the displayed object.

4. The apparatus of claim 1 further comprising:

an adjust scrolling module for scrolling the hierarchy relative to the display to maintain the displayed object on the display after explosion or implosion.

5. A method for navigating through a hierarchy of objects displayed by an information processing system, said method comprising the computer implemented steps of:

detecting a first type or second type of selection of a target object displayed on the display screen by a pointer device in the information processing system; and in response to the first type of selection, marking as visible all children of the target object to a depth level greater than one in the hierarchy past the target object;

in response to the second type of selection, inhibiting visibility of all children of the target object in the hierarchy;

drawing a new hierarchy display wherein is displayed either the total of all objects visible in a current display plus the children of objects marked visible by said marking step, or the remainder of the objects visible in the current display after subtracting children whose visibility is inhibited by said inhibiting step whereby, when the new hierarchy display is drawn, the target object is exploded to display children of the target object through the depth level or children of the target object are imploded into the target object.

6. The method of claim 5 further comprising the step of setting the depth level to a selected level.

7. The method of claim 5 wherein said depth level has a default value of one level.

8. The method of 5 further comprising the steps of:

animating the target object in the new hierarchy display whereby the target object is highlighted after explosion or implosion.

9. The method of claim 5 wherein said marking step further comprises the step of marking as not visible any children at a next level past a predetermined depth level.

10. The method of claim 9 wherein the drawing step comprises the steps of:

laying out a hierarchy tree with each branch of the tree extending until an object marked not visible is reached; and painting only visible objects laid out in each branch so that only objects marked visible are displayed.

11. The method of claim 5 wherein said inhibiting step comprises the steps of:

detecting that children of the target object are marked visible; and in response to detecting children of the target object are visible, marking, as not visible, children at a next level past the target object.

12. The method of claim 11 wherein the drawing step comprises the steps of:

laying out a hierarchy tree with each branch of the tree extending until an object marked not visible is reached; and painting only visible objects laid out in each branch so that only objects marked visible are displayed.

13. The method of claim 5 further comprising the steps of:

setting an object desensitization interval;

blocking said marking step during the object desensitization interval to prevent the object just imploded from being exploded during the object desensitization interval.

14. The method of claim 5 further comprising the steps of:

setting a global desensitization level;

blocking said marking step for any object in the display during the global desensitization level to preserve the hierarchy display during the global desensitization interval.

15. The method of claim 5 wherein the hierarchy display is larger than the display screen window and further comprising the step of scrolling the new hierarchy display to maintain the target object and pointer on the display screen window.

16. A computer program storage medium readable by a computing system and encoding a computer program of instructions for executing a computer process for navigating through nodes of a hierarchy tree displayed by the computing system, said computer process comprising the steps of:

detecting mouse pointer movement pointer within or a mouse click within a node displayed on a display screen;

a marking step, responsive to detection of the mouse movement by said detecting step for marking the children of the node as visible whereby, when the display is redrawn, the node is exploded;

a testing step responsive to detection of mouse click by said detecting step for indicating children of the node are marked visible for display on the display screen;

an inhibiting step, responsive to said testing step indicating the children of the node clicked on are marked visible, for marking the children as invisible whereby, when the display is redrawn, the branches of the node clicked on are imploded and the node becomes an imploded node; and setting levels of explosion for branches from the node to a selected level;

wherein said marking step marks the children of the object visible to a further level of explosion indicated by the selected level.

17. The computer program storage medium of claim 16 where said computer process in the computer program further comprises the steps of:

drawing the hierarchy display with all nodes from a preceding display minus the children of nodes marked invisible by said inhibiting step; and animating the node whose children have been marked invisible by said second marking step whereby the imploded node is highlighted.

18. The computer program storage medium of claim 17 where said computer process in the computer program further comprises the steps of:

setting a node desensitization interval; and blocking said marking step during the node desensitization interval to prevent the node just imploded from being exploded during the node desensitization interval.

19. The computer program storage medium of claim 17 where said computer process in the computer program further comprises the steps of: setting a global desensitization interval;

blocking said marking step for any node in the display during the global desensitization interval to preserve the display of the tree during the global desensitization interval.

20. Apparatus for navigating through a hierarchy of objects in an information processing system in a computer, the computer having a processor, a display, a keyboard, a pointer control device for the display and a data storage device, said apparatus comprising:

means for exploding a displayed object of the hierarchy in response to a first characteristic stroke of the pointer control device while the pointer is within the boundary of the displayed object;

means for imploding nodes branching from a displayed object of the hierarchy in response to a second characteristic stroke of the pointer control device while the pointer is within the boundary of the displayed object; and means responsive to a key stroke for setting the level of further explosion of the object when the displayed object is exploded by the explosion module.

21. The apparatus of claim 20 wherein the first characteristic stroke of the pointer control device is movement of the pointer controlled by the pointer control device within the boundaries of the displayed object.

22. The apparatus of claim 20 wherein the second characteristic stroke of the pointer control device is a mouse click while the pointer is within the boundaries of the displayed object.

23. The apparatus of claim 20 further comprising:

means for scrolling the hierarchy relative to the display to maintain the displayed object on the display after explosion or implosion.

* * * * *